April 13, 1954  W. V. THELANDER  2,674,863
FRICTION CLUTCH PLATE
Filed Dec. 24, 1947  2 Sheets-Sheet 1
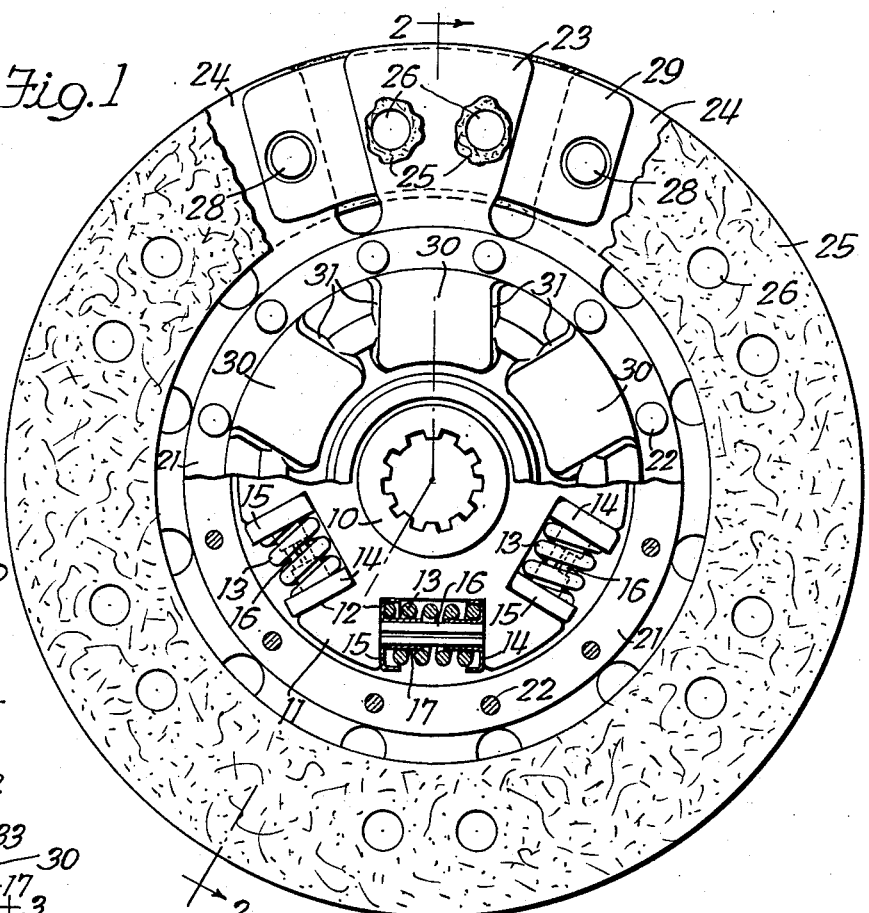
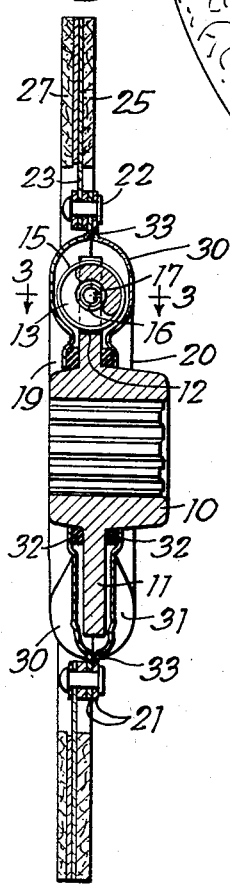
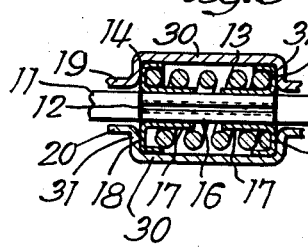
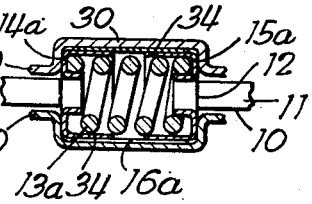
Inventor
W. Vincent Thelander

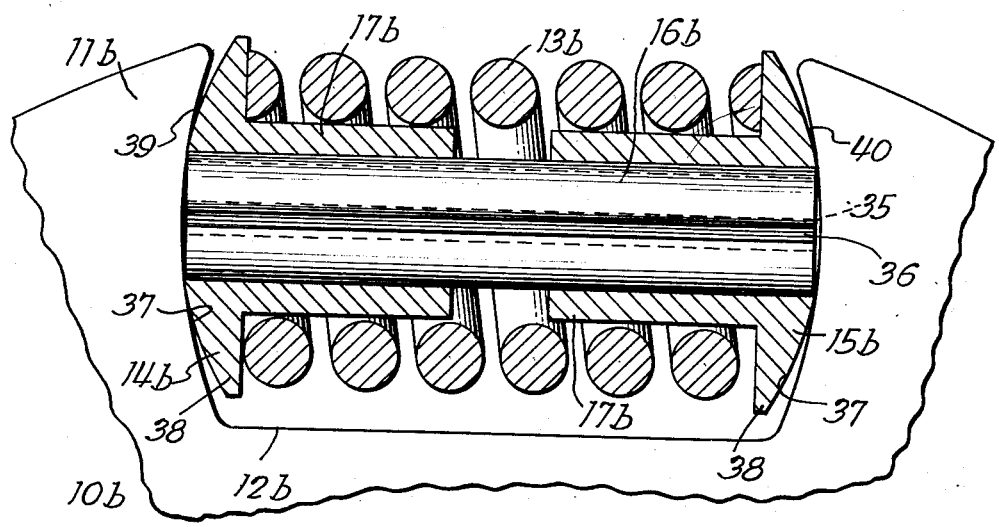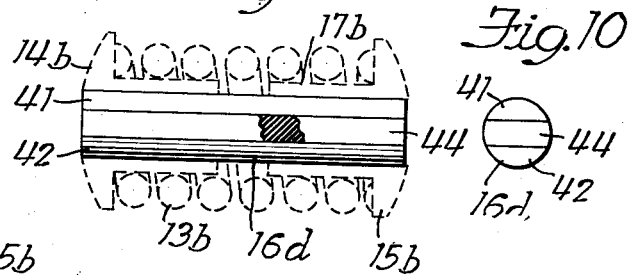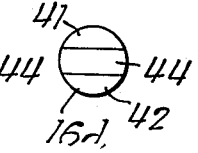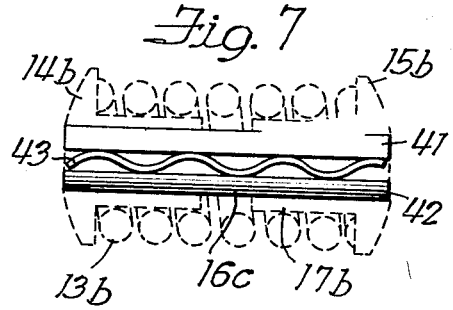
Inventor
W. Vincent Thelander

Patented Apr. 13, 1954

2,674,863

UNITED STATES PATENT OFFICE 2,674,863

FRICTION CLUTCH PLATE

W. Vincent Thelander, Auburn, Ind., assignor to Dana Corporation, Toledo, Ohio, a corporation of Virginia Application December 24, 1947, Serial No. 793,675

13 Claims. (Cl. 64—27)

This invention relates to motion transmitting elements, and is more particularly concerned with improvements in automotive type friction clutch plates, although the present improvements are substantially equally applicable to what are known commercially as vibration dampeners, the present improvements being concerned with shock absorption and vibration dampening.

The principal object is to provide a motion transmitting element, such as a clutch plate, having spring means between the relatively oscillatory inner and outer elements, and incorporating friction brake or drag means working between the opposite ends of each spring to check the recoil action of the springs so as to smoothen the drive. In previous constructions, the braking action occurred between the hub element and the cover plates, but, as pointed out hereinafter, that arrangement not only located the drag too close to the axis of rotation for a good mechanical advantage, but the location was bad from the standpoint that dirt and grit working its way between these relatively moving parts changed the frictional resistance to movement to such an extent that no two plates could be predicted to work alike. By incorporating the friction brake means with the individual springs that are located at a maximum radius from the axis of rotation, I obtain the best mechanical advantage and at the same time avoid the other serious objection mentioned.

In prior constructions manually adjustable friction brake means were provided, as shown, for example, in Wemp Patent No. 1,750,828; but they were not satisfactory for the following reasons:

(1) The original adjustment made at the factory, at the time of assembly of the plate, lasted only a short time because the springs used in connection with the braking means for spring loading invariably had such a high rate of change that only a little wear was enough to throw the brake means almost completely out of commission, and (2) A new adjustment could not be made with any degree of accuracy without removal of the plate from the clutch for testing in a brake test rig, which, of course, would not be practical in most cases because of the great expense that that would entail.

It is, therefore, another important object of my invention to avoid those objections by providing the spring means relied upon for the brake effect of a form having such a low rate of change that the small amount of wear that will occur has no appreciable effect upon the braking action, the spring means employed being, furthermore, of a type which needs no manual adjustment, so that the structure is virtually self-adjusting or self-compensating for wear, and it is practical to incorporate the same inside the clutch plate assembly, it being no longer necessary that it be accessible.

In the preferred embodiment of my invention, a split sleeve or C-section spring is compressed to permit assembly into the elongated hubs of two buttons that fit in and against the opposite ends of the cushioning spring, and this sleeve spring by reason of its tendency to expand affords braking resistance to the compression and subsequent recoil of the cushioning spring. However, other forms of cushioning spring restrictors similarly located and similar in operation may be utilized, as hereinafter described. An important advantage of these restrictors lies in the fact that they will operate satisfactorily wet or dry, that is with or without a lubricant in the form of a heavy oil or grease, thereby avoiding a further objection to certain prior constructions which relied upon the presence of a fluid either as a lubricant or as the working medium for the braking means. Obviously, where a heavy oil or grease is employed with the present invention, it serves not only as a lubricant but as a sound deadener.

The invention is illustrated in the accompanying drawings, in which—

Fig. 1 is a rear view of a clutch plate made in accordance with my invention, showing approximately half of the hub housing plate broken away so as to better illustrate the hub construction, and also showing a portion of one of the friction facings broken away to show the rest of the plate construction;

Fig. 2 is a section on the broken line 2—2 of Fig. 1;

Fig. 3 is a sectional detail on the line 3—3 of Fig. 2, showing one of the springs and its restrictor means on a slightly enlarged scale;

Fig. 4 is a section similar to Fig. 3, showing a modified or alternative construction, in which the sleeve spring is of a contracting form as distinguished from the expanding form of that disclosed in Fig. 3;

Fig. 5 is an enlarged sectional detail in the plane of Fig. 1, showing another, and at present preferred, form of my invention, in which the two buttons fitting in and against the opposite ends of the cushioning spring are oil impregnated 2,674,863

3 and of powdered copper-iron sintered material moulded to the form shown;

Fig. 6 is a perspective view of one of the split cylindrical sleeve springs, shown enlarged to approximately the same extent as in Fig. 5;

Figs. 7 and 8 are a side and end view, respectively, of another spring restrictor construction involving a split pin, between the halves of which a wavy spring is assembled to give the expansive force comparable to that obtained with the sleeve spring of Figs. 1 to 3, 5, and 6, there being indicated in dotted lines in Fig. 7 the cushioning spring and the two buttons in which the restrictor fits for cooperation with the cushioning spring in the same manner as in Figs. 1 to 3, 5, and 6, and Figs. 9 and 10 are views similar to Figs. 7 and 8 showing still another form of spring restrictor involving the use of a split pin with a layer of neoprene or other compressible resilient material therebetween to provide the expansive force, Fig. 9 having indicated in dotted lines the cushioning spring and the buttons cooperating therewith and assembled on the spring restrictor, similarly as in Fig. 7.

Similar reference numerals are applied to corresponding parts throughout the views.

Referring first to Figs. 1 to 3, the clutch plate shown comprises relatively rotatable inner and outer portions, the inner portion being formed by a center hub 10, splined for driving connection with the driving shaft of an automotive transmission and provided with an annular flange 11, in which there are circumferentially spaced notches 12, one for each of a plurality of spring cushioning means 13. Assembled in each notch 12 with the spring 13 are two buttons or pistons 14 and 15 and a split cylindrical or C-section sleeve spring 16, which is compressed radially so as to permit insertion of its opposite end portions in the elongated hub portions 17 of the buttons 14 and 15, the tendency of the spring 16 to expand to its normal diameter being utilized to provide the friction braking effect in the hub portions 17 to resist compression and recoil action of the cushioning springs 13 associated therewith, and also compensate automatically for what little wear will occur, so that there is no need for any manual adjustments and these springs 16 can be assembled inside the clutch plate where they are not accessible. While I have shown the provision of a brake spring 16 associated with each of the drive cushioning springs 13 in Fig. 1, it will be understood that in some cases I may omit some of the brake springs 16 as, for example, from every alternate cushioning spring 13, if that much less braking effect is desired for a given engine. In other words, the application of my invention is quite flexible and easily adaptable to different requirements. The location of the braking means 16—17 at such a distance from the axis of rotation of the plate gives a far better mechanical advantage than in prior constructions where the braking action took place between the hub and the cover radially inwardly with respect to the drive cushioning springs 13, not to mention the fact that with that old arrangement, there was the further disadvantage that any dirt or grit finding its way between the relatively rotatable hub and cover parts had a tendency to change the friction considerably. The buttons 14 and 15 are both of stamped sheet metal construction for economy of manufacture as well as lightness, strength, and durability, and are cupped, as indicated at 18, to receive the opposite ends of the

4 spring 13 therein. The hub portions 17 have an easy working fit in the opposite end portions of the spring 13. Disposed on opposite sides of the flange 11 are two circular sheet metal cover plates 19 and 20, which have annular peripheral flanges 21 disposed in abutment in the plane of the flange 11 and riveted together, as at 22. The rivets 22 also serve to fasten two series of like stamped sheet metal segments 23 and 24 in two planes to the flanges 21 to complete the assembly of the outer element of the clutch plate. The one series of stampings 23 have one of the annular friction facing rings 25 riveted thereto, as at 26, and the other series of stampings 24 have the other annular friction facing ring 27 riveted thereto, as at 28, the first mentioned series of stamping 23 also carrying flat leaf springs 29 fastened by the same rivets 26 to these stampings and disposed with their opposite end portions in overlapping relation to the other series of stampings 24, to provide the desired "mush" effect in the engagement of the clutch. The plates 19 and 20 are formed between dies to provide the circumferentially spaced embossed pocket portions 30 registering with the notches 12 in the flange 11 and housing the cushion or drive springs 13 and their cooperating buttons 14 and 15 and brake springs 16. These embossed portions present end walls 31 for abutment with diametrically opposed portions of each of the buttons 14 and 15 on opposite sides of the flange 11, as clearly appears in Fig. 3. Gasket rings 32 of neoprene rubber or any other suitable compressible material are provided encircling the hub 10 on opposite sides of the flange 11 to seal the plate against ingress of dirt and grit between the relatively oscillatory inner and outer portions of the plate, and, in the event heavy oil or grease is employed for lubrication and sound deadening effect, to prevent leakage thereof between the relatively movable parts of the plate. When heavy oil or grease is used in the plate, the cover plates 19 and 20 are also seam welded annularly at 33 radially outwardly with respect to the pockets 30 and radially inwardly with respect to the rivets 22, whereby positively to seal the plate against leakage of the heavy oil or grease at this joint.

In operation, when relative movement occurs between the inner and outer portions of the clutch plate, the springs 13 are compressed to cushion the drive. In the compression of the springs 13, it will be evident from a study of Fig. 3 that the button 15 is moved to the left by reason of the shoulders 31 on the plates 19 and 20 exerting the driving force. The button 14 and brake spring 16, on the other hand, bear against the far side of the notch 12 in the flange 11 and the spring 13 is compressed to whatever extent is required to overcome the resistance to turning of the propeller shaft. In this relative movement between buttons 14 and 15, the brake spring 16, being of a length approximately equal to the width of the notch 12 and of a diameter approximately equal to the thickness of the flange 11, moves with the flange in whatever relative rotary movement takes place between the hub 10 and the rest of the clutch plate and will offer frictional resistance to the compression of the spring 13 in the movement to the left of the button 15, by reason of its expansive action and consequent frictional resistance to movement in the hub 17 of the button 15. After the resistance to turning of the propeller shaft has been overcome and the springs 13 tend to recoil, the return of the parts to their initial relationship is again frictionally resisted by the brake spring 16, the operation at this point being substantially the reverse of what was just described. In coasting, when, of course, the drive is from the rear axle to the engine, the reverse of the operation just described occurs, the thrust being from left to right in Fig. 3, button 14 being moved to the right relative to button 15 and brake spring 16, to compress the spring 13 against the resistance of brake spring 16, which in the subsequent recoil action of the cushioning spring 13 again resists the relative movement when the button 14 returns to its starting position. In other words, the brake spring 16 having been compressed to permit its assembly in the hubs 17 of the buttons 14 and 15 tends to expand to its normal diameter and, therefore, is held resiliently in tight frictional engagement with the bores of the hub portions 17 of the two buttons. The notches 12 in the flange 11 of the hub, which is the inner portion of the clutch plate, causes the back and forth movement of the brake spring 16 relative to the buttons 14 and 15, and the plates 19 and 20, in which the pocket portions 30 are formed, providing the drive shoulders at 31, cause the buttons 14 and 15 to be moved back and forth relative to the brake spring 16, the plates 19 and 20 forming the outer portion of the clutch plate. The hub portions 17 are elongated enough in relation to the extent of relative angular movement between the hub 10 and the rest of the plate to keep both ends of the brake spring 16 engaged in these hubs and provide ample bearings therefor so that wear is reduced to a minimum. The extent of frictional resistance or drag imposed, I have found, does not vary to any appreciable extent with what little wear results, due to the small amount of relative movement between the parts mentioned in the operation of the clutch. The brake springs 16 being expansible compensate for what little wear occurs, and I accordingly obtain substantially uniform braking action, and a smooth quiet drive is always assured without the necessity for any adjustment or other attention to the clutch plate. The buttons 14 and 15, aside from cooperating with the brake springs 16 for the spring restricting function, serve to retain the coil springs 13 in the desired operative relationship to the relative movable parts of the plate and keep the same in spaced relation to the adjacent parts, so that there will be no danger of the end coils becoming worn by rubbing contact with such adjacent parts. As previously stated, this construction may operate wet or dry, that is with or without a lubricant. If a heavy oil or grease is provided, the wear between the relatively movable parts will, of course, be reduced, and the heavy oil or grease will in addition give a sound deadening effect.

The construction disclosed in Fig. 4 is the same as that shown in Fig. 3, with the exception that the split sleeve spring for the braking effect is enlarged in diameter, as shown at 16a, and is expanded radially to permit assembly over the elongated peripheral flanges 34 of the buttons 14a and 15a, and arranged to rely for its friction drag upon its tendency to contract to its normal diameter. The buttons in this construction are also of sheet metal construction and cupped, as indicated at 18a, for reception of the end portions of the drive cushioning spring 13a. The operation of a clutch plate embodying this construction instead of that shown in Fig. 3 will be substantially the same, as should be obvious.

Furthermore, it will be evident that this construction will also operate wet or dry, that is with or without a lubricant. Where a lubricant is employed, the wear, which would otherwise be very little, due to the small amount of relative movement between the parts, will be substantially reduced, and the heavy oil or grease employed as the lubricant will also give a sound deadening effect.

The construction disclosed in Fig. 5 is generally the same as that of Figs. 1 to 3, but the buttons 14b and 15b are molded to the form shown of powdered copper-iron, the material being subjected to great pressure and sintered to retain its molded shape. These buttons are sufficiently porous to absorb oil for lubrication of the bores of their elongated hub portions 17b, in which the split cylindrical or C-section sleeve brake spring 16b has a tight friction fit, the same as in the form disclosed in Figs. 1 to 3, for the braking action to resist compression and recoil of the drive cushioning spring 13b. In other words, even though the clutch plate embodying this preferred form of spring restrictors may be operated dry, that is without lubricant in the pockets 30 of the cover plates 19—20, the brake springs 16b will nevertheless be assured of sufficient lubrication in the bores of the hubs 16b, so that wear of the relatively movable parts is reduced to a minimum. Attention is called in Fig. 6 to the reinforcing flanges 35, which extend the full length of the brake spring on opposite sides of the gap 36 and are formed by bending the edge portions inwardly. By providing these flanges, I avoid likelihood of the spring breaking under the transverse stresses to which it is subjected in service, even though the spring is made of relative thin stock for lightness and economy. Attention is next called to the spheroidal-shaped outer surfaces 37 on the head ends 38 of the buttons 14b and 15b, which, as shown in Fig. 5, have rocking abutment with the arcuately-shaped ends 39 and 40 of the notches 12b provided in the flange 11b on the hub member 10b, whereby to permit the assembly—consisting of the two buttons, the cushioning spring, and the brake spring—to oscillate as a whole relative to the flange in the compression and recoil of the cushioning spring as the buttons 14b and 15b have relative movement toward and away from one another. This ability of the assembly to rock is important, because it avoids placing excessive stresses on the outer edge portions of the head ends of the buttons, the thrust being assumed instead more nearly at their centers where the greatest strength is concentrated. The arcuate ends 39 and 40 of the notches 12b are struck on larger radii than the spheroidal outer surfaces 37 to provide this rocking abutment and yet retain the combination cushioning and braking assemblies against radially outward displacement under centrifugal force. In passing, it will, of course, be understood that six of the assemblies shown in Fig. 5 will replace the related six assemblies of the form shown in Figs. 1 to 3, each consisting of a cushioning spring 13, buttons 14 and 15 and brake spring 16, the rest of the clutch plate being precisely the same as that disclosed in Figs. 1 to 3, unless, of course, one or more of the brake springs 16b is omitted in a given installation to reduce the brake effect, as hereinabove explained. The operation of the clutch embodying this construction is obviously, therefore, substantially the same as the others, the drive or cushioning springs 13b being disposed between the head portions 38 of the buttons 14b and 15b to cooperate with these buttons and the brake spring in substantially the same manner as previously described. It also goes without saying that this construction will operate wet or dry, that is with or without a lubricant, and where a heavy oil or grease is employed as the lubricant, it functions also as a sound deadener.

In Figs. 7 and 8, I have shown a modified or alternative construction of the spring restrictor at 16c, consisting of a split pin, the spaced sections 41 and 42 of which have a wavy spring 43 disposed therebetween and extending substantially the full length thereof. This assembly is compressible radially for entry in the hubs 17b of the buttons 14b and 15b, similarly as the brake spring 16b in Fig. 5, and functions substantially the same way, to resist compression and recoil of the drive cushioning spring 13b.

In Figs. 9 and 10, I have shown still another modified or alternative construtcion of spring restrictor 16d, in which again I utilize a split pin, the sections 41 and 42 of which have a strip of neoprene rubber sandwiched therebetween, as indicated at 44. This assembly is likewise subjected to radial compression for assembly in the hubs 17b of the buttons 14b and 15b to cooperate with the drive cushioning spring 13b in substantially the same way as the brake spring 16b in Fig. 5.

It will, of course, be evident that I may substitute the spring restrictor assembly of Fig. 7 or Fig. 9 for the brake spring 16b in Fig. 5 or for the brake spring 16 in Figs. 1 to 3 and obtain a clutch plate operating in substantially the same way as above described.

It is believed the foregoing description conveys a good understanding of the objects and advantages of my invention. The appended claims have been drawn to cover all legitimate modifications and adaptations.

I claim:

1. In a rotary motion transmitting element, such as a friction clutch plate, vibration dampener, and the like, comprising a hub member having a flange, and a plate member overlying opposite sides of the flange and oscillatable relative thereto, the plate and flange having a series of rectangularly shaped registering coiled spring receiving portions, coiled springs in said portions compressible between said hub and plate members to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, said buttons having center holes provided therein, and means interconnecting said buttons so as frictionally to resist movement of either button toward and away from the other, said last mentioned means comprising an elongated radially compressible split sleeve spring which is held in tight frictional engagement at its opposite ends in the center holes in said buttons under spring pressure acting substantially radially with respect to said buttons, the split sleeve spring being held against endwise movement relative to the flange and being of a diameter no greater than the thickness of the flange.

2. In a rotary motion transmitting element, such as a friction clutch plate, vibration dampener, and the like, comprising a hub member having a flange, and a plate member overlying opposite sides of the flange and oscillatable relative thereto, the plate and flange having a series of rectangularly shaped registering coiled spring receiving portions, coiled springs in said portions compressible between said hub and plate members to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, said buttons having elongated tubular hub portions, and means for frictionally interconnecting the hub portions of said buttons to resist movement of either button toward and away from the other, comprising an elongated split sleeve spring which is compressed radially and entered at its opposite ends in said hub portions, so that the expansive force of the spring keeps it in tight frictional engagement with said hub portions, the split sleeve spring being held against endwise movement relative to the flange and being of a diameter no greater than the thickness of the flange.

3. In a rotary motion transmitting element, such as a friction clutch plate, vibration dampener, and the like, comprising a hub member having a flange, and a plate member overlying opposite sides of the flange and oscillatable relative thereto, the plate and flange having a series of rectangularly shaped registering coiled spring receiving portions, coiled springs in said portions compressible between said hub and plate members to resist relatively rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, said buttons having elongated tubular hub portions, and means for frictionally interconnecting the hub portions of said buttons to resist movement of either button toward and away from the other, comprising an elongated pin of substantially circular cross-section that is diametrically compressible to permit entry at its opposite ends in said hub portions but is resilient and tends to expand diametrically to its normal uncompressed size, whereby it is held in tight frictional engagement with said hub portions, said pin being held against endwise movement relative to the flange and being of a diameter no greater than the thickness of said flange.

4. In a rotary motion transmitting element, such as a friction clutch plate, vibration dampener, and the like, comprising a hub member, and a plate member oscillatable relative thereto, springs compressible between said hub and plate members to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, said buttons having elongated tubular hub portions, and means for frictionally interconnecting the hub portions of said buttons to resist movement of either button toward and away from the other, comprising an elongated split pin having compressible resilient means assembled between the halves thereof, said pin being compressed diametrically to compress said resilient means to permit assembly at its opposite ends in said hub portions, said pin after assembly in the hub portions tending by virtue of said compressed resilient means to expand diametrically to its normal uncompressed size, whereby it is held in tight frictional engagement with said hub portions.

5. In a rotary motion transmitting element, comprising relatively oscillatable inner and outer members, the inner member comprising a center hub, the outer member comprising a housing enclosing said hub adapted to have limited rotary movement relative thereto, springs compressible between said hub and housing to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, and means interconnecting said buttons so as frictionally to resist movement of either button toward and away from the other, said last mentioned means comprising an elongated split sleeve spring which is held in tight frictional engagement at its opposite ends with said buttons under spring pressure acting substantially radially with respect to said buttons.

6. In a rotary motion transmitting element comprising relatively oscillatable inner and outer members, the inner member comprising a center hub, the outer member comprising a housing enclosing said hub adapted to have limited rotary movement relative thereto, springs compressible between said hub and housing to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, said buttons having elongated tubular hub portions, and means for frictionally interconnecting the hub portions of said buttons to resist movement of either button toward and away from the other, comprising an elongated split sleeve spring which is compressed radially and entered at its opposite ends in said hub portions so that the expansive force of the spring keeps it in tight frictional engagement with said hub portions.

7. In a rotary motion transmitting element comprising relatively oscillatable inner and outer members, the inner member comprising a center hub, the outer member comprising a housing enclosing said hub adapted to have limited rotary movement relative thereto, springs compressible between said hub and housing to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, said buttons having elongated tubular hub portions, and means for frictionally interconnecting the hub portions of said buttons to resist movement of either button toward and away from the other, comprising an elongated pin of substantially circular cross-section that is diametrically compressible to permit entry at its opposite ends in said hub portions but is resilient and tends to expand diametrically to its normal uncompressed size, whereby it is held in tight frictional engagement with said hub portions.

8. In a rotary motion transmitting element, such as a friction clutch plate, vibration dampener, and the like, comprising a hub member having a flange, and a plate member overlying opposite sides of the flange and oscillatable relative thereto, the plate and flange having a series of rectangularly shaped registering coiled spring receiving portions, coiled springs in said portions compressible between said hub and plate members to resist the relative rotary movement therebetween, and friction brake means individual to certain of said springs mechanically to resist both compression and recoil thereof, each of said brake means comprising buttons abutting opposite ends of the associated spring and transmitting pressure to said spring in the drive cushioning function thereof, and means interconnecting said buttons so as frictionally to resist movement of either button toward and away from the other, said last mentioned means comprising an elongated split sleeve spring which is held in tight frictional engagement at its opposite ends with said buttons under spring pressure acting substantially radially with respect to said buttons.

9. A clutch plate comprising a hub having an annular radial flange of appreciable thickness, a pair of annular members enclosing said flange from opposite sides and secured together and carrying a facing-supporting disk, said flange and annular members having registering openings, coiled springs seated in said openings and arranged yieldingly to resist relative rotary movement between said flange and said annular members, and a plurality of structurally independent spring restrictor assemblies, one for each of said springs, each assembly comprising buttons abutting opposite ends of the associated spring and transmitting pressure to said spring upon relative rotary movement between the flange and annular members, and means interconnecting said buttons so as frictionally to resist movement of either button toward and away from the other, said last mentioned means comprising an elongated split sleeve spring that is no greater in diameter than the thickness of said flange and is held in tight frictional engagement at its opposite ends with said buttons under spring pressure acting substantially radially with respect to said buttons.

10. A clutch plate comprising a hub having an annular radial flange of appreciable thickness, a pair of annular members enclosing said flange from opposite sides and secured together and carrying a facing-supporting disk, said flange and annular members having registering openings, coiled springs seated in said openings and arranged yieldingly to resist relative rotary movement between said flange and said annular members, and a plurality of structurally independent spring restrictor assemblies, one for each of said springs, each assembly comprising buttons abutting opposite ends of the associated spring and transmitting pressure to said spring upon relative rotary movement between the flange and annular members, and means interconnecting said buttons so as frictionally to resist movement of either button toward and away from the other, said last mentioned means comprising an elongated split sleeve spring that is no greater in diameter than the thickness of said flange and is held in tight frictional engagement at its opposite ends with said buttons under spring pressure acting substantially radially with respect to said buttons, said buttons having elongated tubular hub portions and said split sleeve spring being compressed radially and entered at its opposite ends in said hub portions so that the expansive force of the spring keeps it in tight frictional engagement with said hub portions.

11. A clutch plate comprising a hub having an annular radial flange of appreciable thickness, a pair of annular members enclosing said flange from opposite sides and secured together and carrying a facing-supporting disk, said flange and annular members having registering openings, coiled springs seated in said openings and arranged yieldingly to resist relative rotary movement between said flange and said annular members, and a plurality of structurally independent spring restrictor assemblies, one for each of said springs, each assembly comprising buttons abutting opposite ends of the associated spring and transmitting pressure to said spring upon relative rotary movement between the flange and annular members, and means interconnecting said buttons so as frictionally to resist movement of either button toward and away from the other, said last mentioned means comprising an elongated split sleeve spring that is no greater in diameter than the thickness of said flange and is held in tight frictional engagement at its opposite ends with said buttons under spring pressure acting substantially radially with respect to said buttons, said buttons having center holes provided therein, and said sleeve spring being compressed radially and entered at its opposite ends in said center holes so that the expansive force of the spring keeps it in tight frictional engagement with said center holes.

12. A clutch plate comprising a hub having an annular radial flange of appreciable thickness, a pair of annular members enclosing said flange from opposite sides and secured together and carrying a facing-supporting disk, said flange and annular members having registering openings, coiled springs seated in said openings and arranged yieldingly to resist relative rotary movement between said flange and said annular members, and a plurality of structurally independent spring restrictor assemblies, one for each of said springs, each assembly comprising buttons abutting opposite ends of the associated spring and transmitting pressure to said spring upon relative rotary movement between the flange and annular members, and means interconnecting said buttons so as frictionally to resist movement of either button toward and away from the other, said last mentioned means comprising an elongated pin of substantially circular cross-section that is no larger in diameter than the thickness of said flange and is diametrically compressible, said buttons having center holes and said pin being compressed radially and entered at its opposite ends in said center holes so that the expansive force of the pin keeps it in tight frictional engagement with said center holes.

13. A clutch plate comprising a hub having an annular radial flange of appreciable thickness, a pair of annular members enclosing said flange from opposite sides and secured together and carrying a facing-supporting disk, said flange and annular members having registering openings, coiled springs seated in said openings and arranged yieldingly to resist relative rotary movement between said flange and said annular members, and a plurality of structurally independent spring restrictor assemblies, one for each of said springs, each assembly comprising buttons abutting opposite ends of the associated spring and transmitting pressure to said spring upon relative rotary movement between the flange and annular members, and means interconnecting said buttons so as frictionally to resist movement of either button toward and away from the other, said last mentioned means comprising an elongated pin of substantially circular cross-section that is no larger in diameter than the thickness of said flange and is diametrically compressible, said buttons having elongated tubular hub portions and said pin being compressed radially and entered at its opposite ends in said hub portions so that the expansive force of the pin keeps it in tight frictional engagement with said hub portions.

References Cited in the file of this patent

UNITED STATES PATENTS

| Number | Name | Date |
| --- | --- | --- |
| 775,582 | Shea | Nov. 22, 1904 |
| 1,192,731 | Batchelder | July 25, 1916 |
| 1,749,554 | Wichert | Mar. 4, 1930 |
| 2,216,231 | Dentler | Oct. 1, 1940 |
| 2,316,820 | Thelander | Apr. 20, 1943 |
| 2,321,941 | Rose | June 15, 1943 |
| 2,342,989 | Ware | Feb. 29, 1944 |
| 2,358,510 | Holland et al. | Sept. 19, 1944 |